I. D. JEWETT.
PROCESS OF PRESERVING RUBBER.
APPLICATION FILED AUG. 19, 1913.
1,130,736.
Patented Mar. 9, 1915.
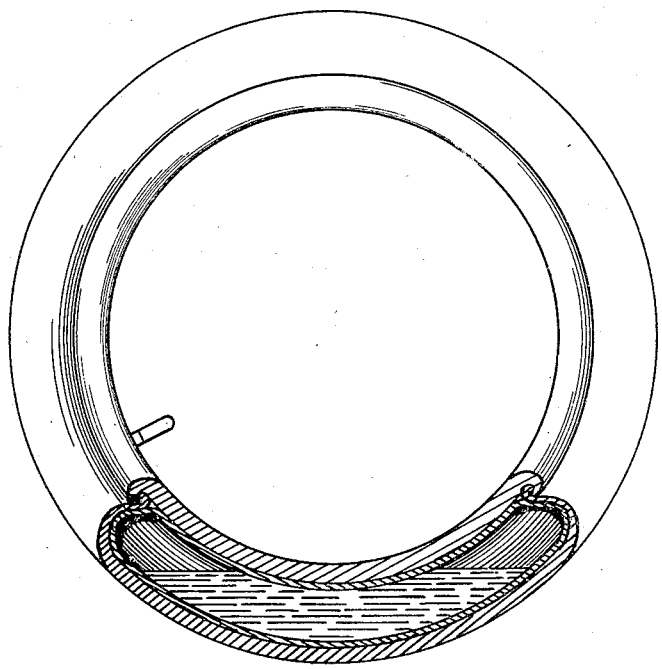
WITNESSES;
INVENTOR,
ISRAEL D. JEWETT,

UNITED STATES PATENT OFFICE.

ISRAEL D. JEWETT, OF ST. PAUL, INDIANA.

PROCESS OF PRESERVING RUBBER.

1,130,736.  Specification of Letters Patent.  Patented Mar. 9, 1915.

Application filed August 19, 1913. Serial No. 785,482.

*To all whom it may concern:*

Be it known that I, ISRAEL D. JEWETT, a citizen of the United States, residing at St. Paul, in the county of Decatur and State of Indiana, have invented certain new and useful Improvements in Processes of Preserving Rubber, of which the following is a specification.

The object of this invention is to preserve the resiliency, strength and life of elastic rubber by the application to it of a preservative composition which is gradually absorbed by the rubber. My invention is particularly applicable to such treatment of the rubber inner tubes and casings of pneumatic tires, into the air chambers of which tires it is introduced and spread by the revolutions of the tires in their ordinary use and is forced into the rubber by the pressure of the air with which the tires are inflated. This pressure is increased by the flattening of the tire occasioned by the weight of the load of the vehicle which the tires are required to support when in use.

The accompanying drawing shows the rim of a wheel in side elevation and partial vertical section, equipped with a pneumatic tire containing my preservative composition of matter.

My preferred composition consists of the following ingredients, combined in the proportions stated, viz:

Glycerin _____ 1 gallon.
Corn-syrup _____ 1 gallon.

The glycerin is heated to about the boiling point and then the corn-syrup is added slowly, the mixture being stirred until the syrup is completely dissolved and mixed. To the above I prefer, in practice, to add approximately ten grains of anilin (red) in order to make the preparation visible in handling it.

When cold, the above-named composition is ready for use. It can be applied to advantage to any kind of soft elastic rubber and in any manner which will bring it in contact with the surface of the rubber. It will not restore old, hard and decayed rubber, but, if used on new rubber, or on that which is still soft and elastic, it will keep such rubber from becoming inelastic and dead, and will prevent the formation of pin-holes, due to decay.

In the application of the above-named composition to pneumatic tires it is introduced through the same nipple that is provided for the introduction of air into the tire, and the same pump which is used for supplying air to the pneumatic tire is used in injecting my preservative composition therein. This is accomplished by connecting up the air pump with the tire in the usual way; by removing the piston and filling the cylinder with my composition, and then by forcing it into the tire by the aid of the replaced piston, in the same manner that air would have been injected. After a short period of use a tire thus supplied with my composition will have its interior thoroughly coated with it and the glycerin will be retained in contact with the inner surfaces, where it has been thus supplied, by the greater adhesiveness of the corn-syrup, and after a few days' application the glycerin will have been absorbed through both the inner and outer tubes.

Having thus fully described my invention, what I claim as new and wish to secure by Letters Patent of the United States, is,—

1. The process of preserving rubber which consists of coating its surface with a mixture of glycerin and syrup.

2. The process of preserving rubber which consists of coating its surface with a mixture of glycerin and corn syrup in substantially equal parts.

In witness whereof, I, have hereunto set my hand and seal at Indianapolis, Indiana, this 8th day of August, A. D. one thousand nine hundred and thirteen.

ISRAEL D. JEWETT. [L. S.]

Witnesses:
J. A. MINTURN,
W. J. KALER.